United States Patent
Hureau et al.

(10) Patent No.: US 11,368,090 B2
(45) Date of Patent: Jun. 21, 2022

(54) MULTIPHASE DC TO DC CONVERTERS WITH PHASE SHEDDING, AND SUB-UNITS AND METHODS THEREFOR

(71) Applicants: NXP USA, Inc., Austin, TX (US); INSTITUT NATIONAL POLYTECHNIQUE DE TOULOUSE (INPT), Toulouse (FR)

(72) Inventors: Loic Hureau, Toulouse (FR); Marc Michel Cousineau, Lavaur (FR)

(73) Assignees: NXP USA, Inc., Austin, TX (US); INSTITUT NATIONAL POLYTECHNIQUE DE TOULOUSE (INPT), Toulouse (FR)

( * ) Notice: Subject to any disclaimer, the term of this patent is extended or adjusted under 35 U.S.C. 154(b) by 0 days.

(21) Appl. No.: 17/109,423

(22) Filed: Dec. 2, 2020

(65) Prior Publication Data
US 2021/0167688 A1    Jun. 3, 2021

(30) Foreign Application Priority Data
Dec. 3, 2019   (EP) ..................... 19306558

(51) Int. Cl.
 *H02M 3/158*   (2006.01)
(52) U.S. Cl.
 CPC ................. *H02M 3/1584* (2013.01)
(58) Field of Classification Search
 None
 See application file for complete search history.

(56) References Cited

U.S. PATENT DOCUMENTS 7,782,032 B2    8/2010  Taufik et al.
8,279,645 B2 *  10/2012 Bridge ................ H02M 3/1584
                                              363/65
(Continued)

FOREIGN PATENT DOCUMENTS

CN    110445380 A    11/2019
CN    110445381 A    11/2019

OTHER PUBLICATIONS

Ahn, Youngkook et al; "A Multiphase Buck Converter With a Rotating Phase-Shedding Scheme For Efficient Light-Load Control"; IEEE Journal of Solid-State Circuits, vol. 49, No. 11; 11 pages (Nov. 2014).

(Continued)

*Primary Examiner* — Jeffrey A Gblende

(57) ABSTRACT

A local control-unit operable as a master or a slave comprises: a memory indicative of whether the converter sub-unit is enabled or disabled; and an enable; a wake-up output; a communication link input and output interfaces configured to receive and to send master/slave information; and a further communication link input and output interfaces, configured to both enable current balancing and phase interleaving with other enabled converter sub-units; and being adapted and configured to: in response to the respective local output current being higher than a first threshold, send a wake-up request to the next converter sub-unit; and in response to (a) being a slave sub-unit; (b) the respective local output current being lower than a second threshold, and (c) receiving master/slave information indicative that the next enabled sub-unit is a master sub-unit, disabling itself. Methods of operating the same are also disclosed.

18 Claims, 9 Drawing Sheets

(56) References Cited

U.S. PATENT DOCUMENTS

| | | | |
|---|---|---|---|
| 9,461,544 B2 | 10/2016 | Nien et al. | |
| 9,606,559 B2 | 3/2017 | Ozawa | |
| 9,608,450 B2 | 3/2017 | Cousineau | |
| 10,381,918 B1 * | 8/2019 | Stoichita | H02M 3/1584 |
| 11,081,954 B2 * | 8/2021 | Jiang | H02M 3/1584 |
| 2008/0197823 A1 | 8/2008 | Crowther et al. | |
| 2020/0366203 A1 * | 11/2020 | Mei | H02M 3/1582 |

OTHER PUBLICATIONS

Chen, Shih-Min et al; "Challenge on Compact Size DC-DC Buck Converters with High-Speed Current Sensor and On-Chip Inductors"; IEEE Midwest Symposium on Circuts & Systems/ IEEE Int'l Northeast Workshop on Circuits & Systems; 4 pages (2007).

Cousineau, M. et al; "Triangular Carrier Self-Alingment Using Modular Approach for Interleaved Converter Control"; Proceedings of the 14 European Conference on Power Electronics and Applications; 10 pages (Aug. 30, 2011).

Xiao, Zijian et al; "Modular Control of Parallel Isolated Micro-Converters Dedicated to Conversion Network"; IEEE Applied Power Electronics Conference and Exposition; pp. 2555-2562 (2013).

\* cited by examiner

MULTIPHASE DC TO DC CONVERTERS WITH PHASE SHEDDING, AND SUB-UNITS AND METHODS THEREFOR

CROSS-REFERENCE TO RELATED APPLICATIONS

This application claims the priority under 35 U.S.C. § 119 of European patent application no. 19306558.8, filed Dec. 3, 2019 the contents of which are incorporated by reference herein.

FIELD

This disclosure relates to multiphase DC-DC converters, converter sub-units thereof, local control-units thereof, and methods of operating the same.

BACKGROUND

It is known that the efficiency of a DC-DC power converter, also known as a DC-DC converter, may vary significantly with the output current produced, and fall if the current is either too low or too high. In order to improve the efficiency at low power, the controller of a DC-DC converter may be arranged to operate in a low power mode: such modes will be familiar to the skilled person. In order to improve the efficiency, it is also known to combine multiple power converters as sub-units. Since it is conventional to operate each converter sub-unit at a different phase, such an arrangement of multiple converters is generally known as a multiphase DC-DC converter. It is also known to disable one or more of the converters, in dependence on the required power output, in order to maintain a high efficiency over a wide range of operational outputs.

An example plot of operating efficiency for such a multiphase DC-DC converter is shown in FIG. 1a. The operational efficiency is shown on the y-axis or ordinate, as the output current varies—as shown on the x-axis or abscissa. The separate curves 110, 120 . . . 150 show the operating efficiency characteristic when 1, 2, . . . and up to 5 converter sub-units are operational in a normal power mode. By enabling or disabling individual sub-units as required, such that each sub-unit provides output current within a range between an acceptable minimum and an acceptable maximum, the operational efficiency may be kept high, as shown in the solid line 170.

Conventionally, such multiphase DC-DC converters are controlled by means of a central controller, which provides control information to each of the separate converter sub-units. However, for some applications, for instance where the number of subunits is very high or when a centralized controller is not authorized for fault-tolerant reasons, it may be desirable to distribute the control, and at least one way of doing so has recently been proposed. In such a situation, determining when and how the individual converter sub-units should be enabled or disabled, without a central controller, may be challenging.

SUMMARY

According to a first aspect of the present invention there is disclosed a local control-unit configured for use in a converter sub-unit of a multiphase DC-DC converter, the multiphase DC-DC converter comprising a plurality of converter sub-units arranged in parallel, each converter sub-unit having a respective inductor, a respective switching cell, and a respective local control-unit, the local control units being arranged in a logical daisy-chain, the local control-unit comprising: a state indicator indicative of whether the converter sub-unit is operable as a master (M) sub-unit or a slave (S) sub-unit; a memory designated to indicate whether the converter sub-unit is enabled or disabled; an enable input configured to receive an enable request; a wake-up output configured to send a wake-up request; a communication link input interface and a communication link output interface respectively configured to receive and to send master/slave information; and a further communication link input interface and a further communication link output interface, configured to enable or manage both current balancing and phase interleaving with other enabled converter sub-units; and being adapted and configured to: in response to the respective local output current being higher than a first threshold, send a wake-up request requesting that the next converter sub-unit be enabled; and in response to (a) the state indicator being indicative that the local control-unit is operable as a slave sub-unit; (b) the respective local output current being lower than a second threshold, and (c) receiving master/slave information indicative that the next enabled sub-unit in the daisy-chain is a master sub-unit, disabling itself. The enable request may typically correspond to a wake-up request sent from a previous local control-unit; alternatively, it may come from a start-up signal or a global wake-up request. Each converter subunit is thus under local control, by means of its respective local control-unit. This not only generally includes current balancing between the converter subunits but also the decision as to whether or not the converter subunit is enabled or disabled is determined locally without the requirement for a central controller.

The local control-unit can thereby determine, relying only on information provided from its neighbours in the daisy-chain, whether or not it should disable itself in order to reduce the total number of phases operable for the multiphase DC-DC converter.

In one or more embodiments, the local control-unit is further adapted and configured to: in response to (a) the state indicator being indicative that the local control-unit is operable as a master sub-unit; (b) the respective local output current being lower than the second threshold, and (c) receiving master/slave information indicative that the next enabled sub-unit in the daisy-chain is the master sub-unit, entering a low power control mode; and in response to (a) the state indicator being indicative that the local control-unit is operable as the master sub-unit, (b) the respective local output current being higher than the first threshold, and (d) the local control-unit being in the low power control mode, entering a normal control mode. Thereby, a local control-unit may be enabled to enter a low by power mode in the case that it is the sole operating converter sub-unit and that normal operation would result in an inappropriately low output current and efficiency.

In one or more embodiments, the low power control mode comprises wherein the low power control mode comprises a one of: hysteretic control modes such as Pulse-Frequency Modulation (PFM), Auto Pulse Skipping (APS) for instance or linear regulation modes such as Low Droop Out (LDO). It should be noted that these are examples only, and the skilled person will be familiar with various low power control modes, which are facilitated according to the present disclosure.

In one or more embodiments, the local control-unit is further configured to connect the communication link input interface communication link output interface at the end of a programmable delay after the local control-unit disabled itself, to pass through master/slave information. This may assist in providing for an orderly shedding of more than one phase.

In one or more embodiments, the local control-unit further comprises a global wake-up output configured to transmit a global enable request to all other converter sub-units in the DC-DC converter, and a start-up input configured to receive a global enable request. Thereby, a fast start-up of a multiphase DC-DC converter with full current capability may be achievable.

In one or more embodiments the communication link interface and the further communication link interface are arranged as interfaces either to a common parallel bus or to separate parallel buses. In other embodiments the communication link interface and the further communication link interface are arranged as interfaces to a common serial bus. As will be appreciated from reading the detailed description below, embodiments in which the communication links are parallel and analogue are particularly straightforward to implement. However, in some embodiments may be appropriate to include digital control using serial communication links.

In one or more embodiments, the local control-unit further comprises an input from a comparator configured to determine whether the current output is greater than a third predetermined threshold (Iinrush), and is configured to broadcast a general wake-up signal, in response to a signal indicative that the output current is higher than the third predetermined threshold. Thereby, a fast start-up of a multiphase DC-DC converter with full current capability may be achievable in an inrush current event.

According to a further aspect of the present disclosure, there is provided controller for a multiphase DC-DC converter, comprising a plurality of local control-units as described above, logically arranged in a daisy-chain. In one or more embodiments the plurality of local control-units are identical. In such embodiments, the controller which is to act as the master controller may be determined at a time prior to operation of the controller. In other embodiments one of the controllers is preconfigured as the master controller.

According to a yet further aspect of the present disclosure there is provided a DC-DC converter comprising such a controller, wherein the DC-DC converter comprises, associated with each local control-unit, a respective inductor and a respective switching cell, which together with the local control-unit form the respective converter sub-unit.

According to another aspect of the present disclosure there is provided a method of controlling a multiphase DC-DC converter, the multiphase DC-DC converter comprising a plurality of converter sub-units arranged in parallel, each converter sub-unit having a respective inductor, a respective switching cell, and a respective local control-unit, each converter sub-unit being configured to provide a respective local output current when enabled and no output current when disabled, and being configured to, when disabled, pass master/slave information from a next converter sub-unit in the daisy-chain to a previous converter sub-unit, the respective local control-units being connected in a logical daisy-chain, the method comprising, in an operational mode: designating a one converter sub-unit as a master sub-unit, and the other converter sub-units as slave sub-units; each of the local control-units receiving master/slave information indicative of whether a next enabled converter sub-unit in the daisy-chain is a master sub-unit or a slave sub-unit;

the one of the local control-units, in response to the respective local output current being higher than a first threshold, sending a wake-up request requesting that the next converter sub-unit be enabled; and the one of the local control-units, in response to (a) the one of the local control-units being a slave sub-unit, (b) the respective local output current being lower than a second threshold and (c) the next enabled sub-unit in the daisy-chain being a master sub-unit, disabling itself.

In one or more embodiments the method further comprises: the one of the local control-units, in response to (a) the one of the local control-units being the master sub-unit, (b) the respective local output current being lower than the second threshold and (c) the next enabled sub-unit in the daisy-chain being the master sub-unit, entering a low power control mode; and the one of the local control-units, in response to (a) the one of the local control-units being the master sub-unit, (b) the respective local output current being higher than the first threshold, and (d) the one of the local control-units being in the low power control mode, entering a normal control mode.

In one or more embodiments the method further comprises operating in wake-up mode during a start-up period, by: the master sub-unit, at the start of the start-up period, transmitting an enable request to all the slave sub-units; and the master sub-unit transmitting a signal indicative of acting as a slave sub-unit for the duration of the start-up period. Thereby, it may be possible to ensure that all the local control-units remain enabled during the start-up period: since none of the units can satisfy the requirement for disablement that "the next enabled sub-unit in the daisy-chain is a master sub-unit".

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which FIG. 1a plots the operating efficiency against output current of a multiphase DC-DC converter with one or more converter sub-units operational.

Figure 1A:
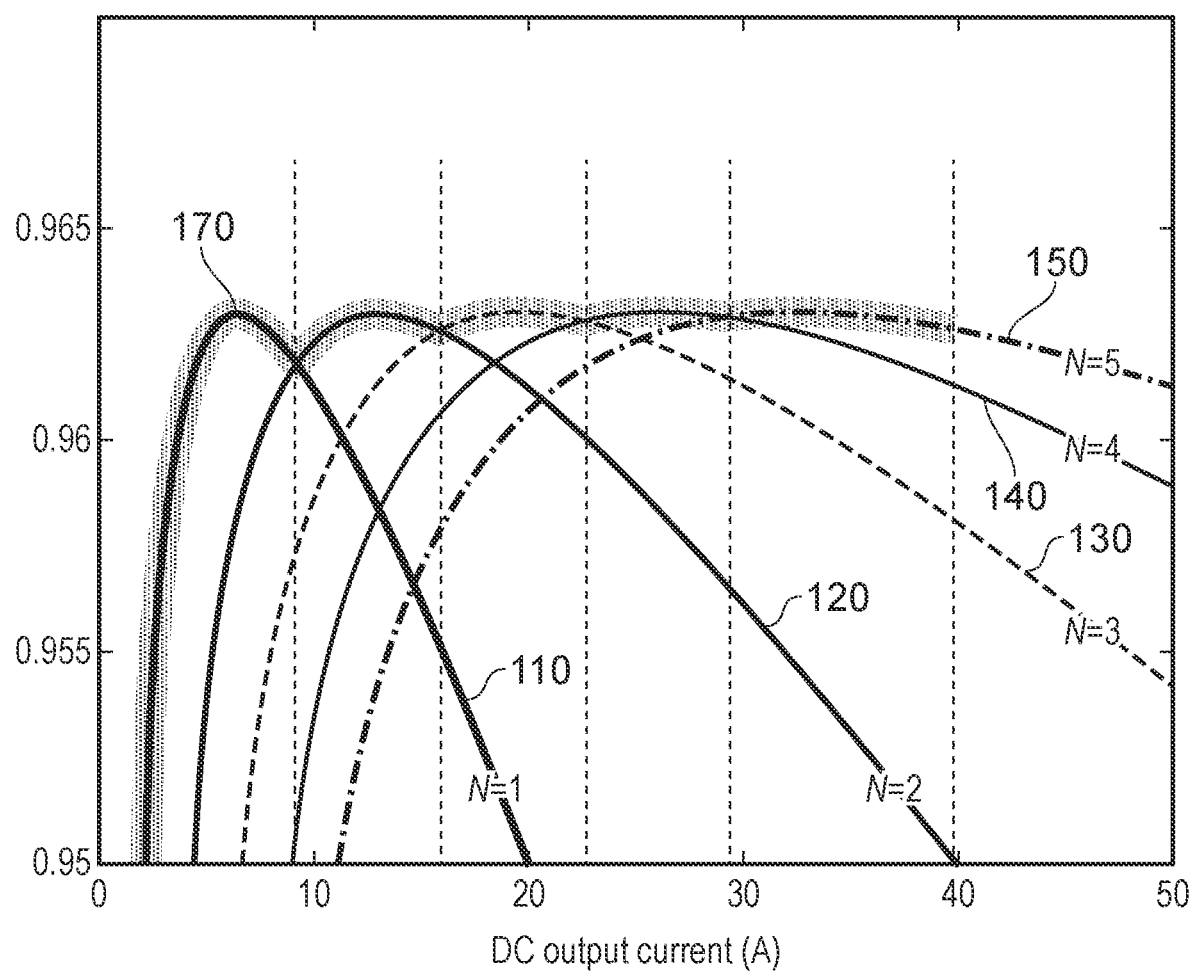
FIG. 1b shows minimum and maximum values of local output current Ii, for a threshold minimum acceptable efficiency, for a single (ith) phase of a multiphase DC-DC converter.

It should be noted that the figures are diagrammatic and not necessarily drawn to scale. Relative dimensions and proportions of parts of these figures may be shown exaggerated or reduced in size, for the sake of clarity and convenience in the drawings. The same reference signs are generally used to refer to corresponding or similar features in modified and different embodiments

DETAILED DESCRIPTION OF EMBODIMENTS

Figure 2:
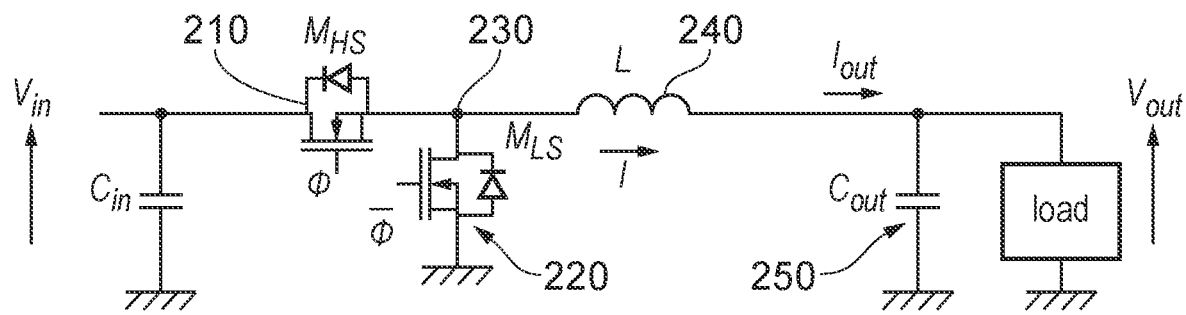
FIG. 2 shows a circuit diagram of a single phase DC-DC converter.

FIG. 2 illustrates a circuit diagram of a single phase DC-DC converter (or equivalently, one phase of a multiphase DC-DC converter).

The converter configuration will be well known to those skilled in the art. Two transistors, 210 and 220, also known as high-side transistor 210 and low-side transistor 220, connect a supply (shown as a Vin) to a ground. The high-side and low-side transistors may be together be known as a switching cell. An input smoothing capacitor Cin may be provided. The transistors are arranged to operate in complementarity, such that a half-bridge node 230 therebetween is alternately connected to the supply voltage, and to ground. The ratio between the on-time of the two transistors may be varied or modulated—resulting in pulse width modulation (PWM) of the voltage of the half-bridge node. An inductor 240 is connected between the half-bridge node and the output. When the half-bridge node is connected to the supply voltage, the current I through the inductor rises (the rate of increase being dependent on the inductance L), to provide an output current Iout. There may be provided a smoothing capacitor 250 with capacitance Cout for the output current as shown.

Figure 3:
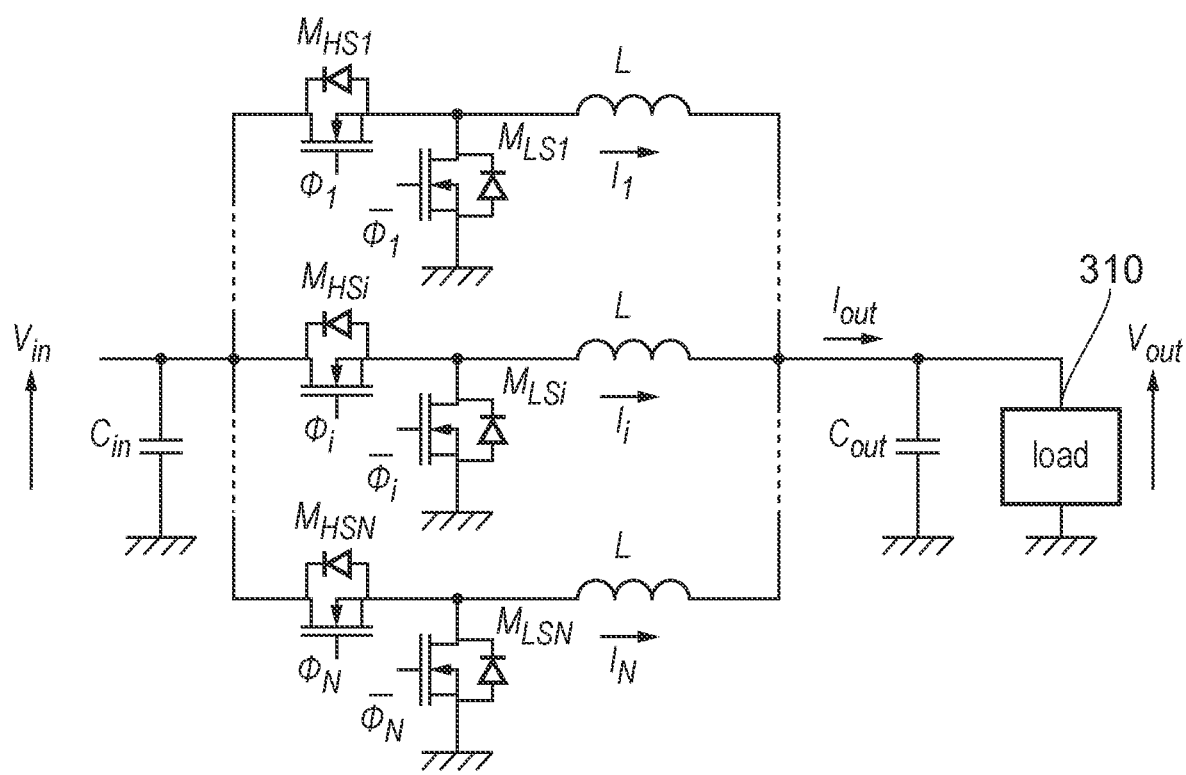
FIG. 3 shows a circuit diagram equivalent to FIG. 2 but for a multiphase DC-DC converter.

FIG. 3 shows similar circuit diagram for a multiphase DC-DC converter, with which the skilled person will also be familiar. Three phases of an N phase multiphase DC-DC converter are shown in FIG. 3. Each phase includes a high-side and a low-side transistor, having a half-bridge node therebetween, the half-bridge node being connected to the common output point through a respective inductor. The currents $I_1, \ldots I_i, \ldots I_N$ through the $1^{st}, \ldots i^{th}, \ldots N^{th}$ converter sub-units (or phases) are summed to provide the output current Iout. The output is provided to a load 310, which may be a microprocessor µP as shown.

Figure 4:
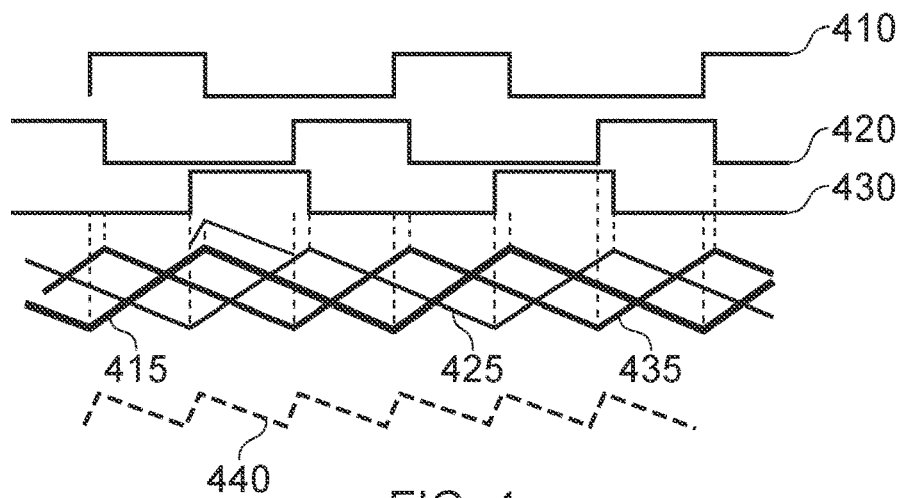
FIG. 4 shows the PWM (pulse width modulation) control signals, and output current of each phase of a multiphase DC-DC converter, together with the total output current.

FIG. 4 shows a control mechanism for each of the three phases of a three-phase DC-DC converter. In this example, each phase is operating in CCM (continuous current mode). As described above with reference to FIG. 3, the converter sub-units each comprise a pair of switches arranged in series, and configured to operate in complementarity such that the half-bridge node between them is alternately connected to an input voltage (Vin) and a ground. The voltage at the half-bridge node thus varies according to a PWM signal as shown at 410, 420, and 430 for the three separate phases. While the half-bridge node is at the input voltage Vin, the current through the inductor of the converter sub-unit rises, and while the half-bridge node is at ground, the current falls, resulting in a triangular shape of the current output from the converter sub-unit. The triangular shape may generally be asymmetric. The current output from each converter sub-unit (or "phase"), is shown at 415, 425, and 435 respectively. The total output current is shown at 440. The ripple on the output voltage may be reduced by an output capacitor Cout. To vary the total output power, the mark-space ratio of the PWM signals is varied according to a control mechanism.

As mentioned above, it is conventional for multiphase DC-DC converters to be controlled centrally. However, one of the inventors of the present disclosure has developed a method by which decentralised control is possible. Such a method is disclosed for instance in international patent application publication number WO2014/005973, the entire contents of which are hereby incorporated by reference. This method allows for decentralised, or localised, control of each converter sub-unit. The local control-units for the converter sub-units are arranged in a daisy-chain configuration. Each local control-unit requires only communication with its two neighbouring controllers (the "next" and "previous" controllers from the standpoint of the daisy-chain).

Figure 5:
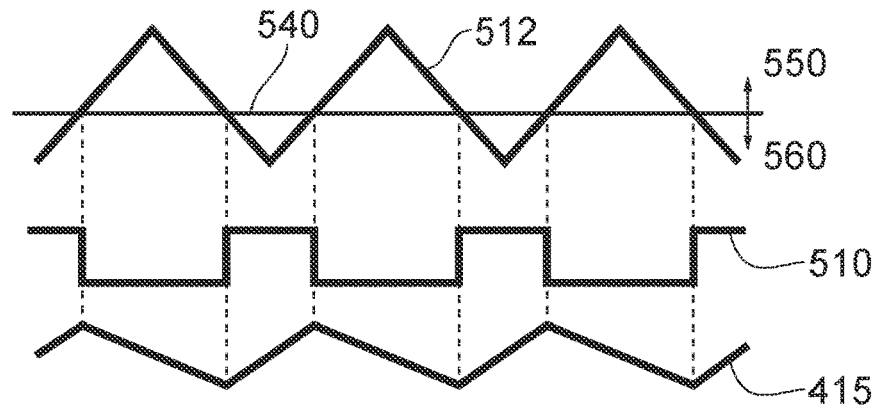
FIG. 5 shows the PWM signal, phase current, and an associated modulating signal, of one phase of a DC-DC converter.

This is implemented by introducing the concept of "auto-interleaving" of "triangular carrier signals". The concept shown is schematically, for a single phase, in FIG. 5, and for each of three phases in a three-phase converter in FIG. 6. A symmetrical triangular waveform is created as signal 512, and 612, 622 and 632 for each separate phase 510 in FIG. 5, and 610, 620 and 630 in FIG. 6. Proper interleaving of the phases is achieved by temporarily adjusting the frequency of one or more of the triangular carrier signals 512 in FIG. 5, and 612, 622, 632 in FIG. 6. As explained in detail in M. Cousineau et al, "Triangular Carrier Self-Alignment Using Modular Approach for Interleaved Converter Control", Proceedings of the 2011-14th European Conference on Power Electronics and Applications, Aug. 30, 2011, pp. 1-10, the slew rate, or the voltage levels of the carrier, of each triangular carrier can be adjusted up, or down—thereby increasing or decreasing its frequency, in dependence on the interleaving between (only) the respective triangular carrier signals of (only) the two neighboring phases. Thereby, proper—that is to say, equi-spaced—interleaving can be achieved.

Further, the triangular carrier signal can be used, to generate the local PWM control signal directly. The half-bridge node is set to be high (that is to say, the PWM signal 430 is set to "on") when the triangular carrier signal crosses, in a falling direction, a predetermined threshold 540. The level of the threshold is set by the "modulating signal" determined by the voltage regulator using a control technique known as "AVP" (adaptive voltage positioning); conversely, the half-bridge node is set low (that is to say, the PWM signal is set to "off") when the modulating signal crosses, in a rising direction, the predetermined threshold. The phase current—that is to say, the current from this converter sub-unit—is shown at 540.

The predetermined threshold 540 may be varied—that is to say, the modulating signal can be changed. As shown at 550, if the predetermined threshold 540 is increased, the fraction of time that the modulating signal is below the threshold increases, and in consequence, the fraction of time during which the PWM signal is on increases, which results in a temporarily increased output current from the phase and an increase in the average output voltage. Conversely, as shown at 560, if the predetermined threshold 540 is decreased, the fraction of time that the modulating signal is below the threshold decreases, and in consequence, the fraction of time it during which the PWM signal is on decreases, which results in a temporarily decreased output current from the phase and a decrease in the average output voltage.

Figure 6:
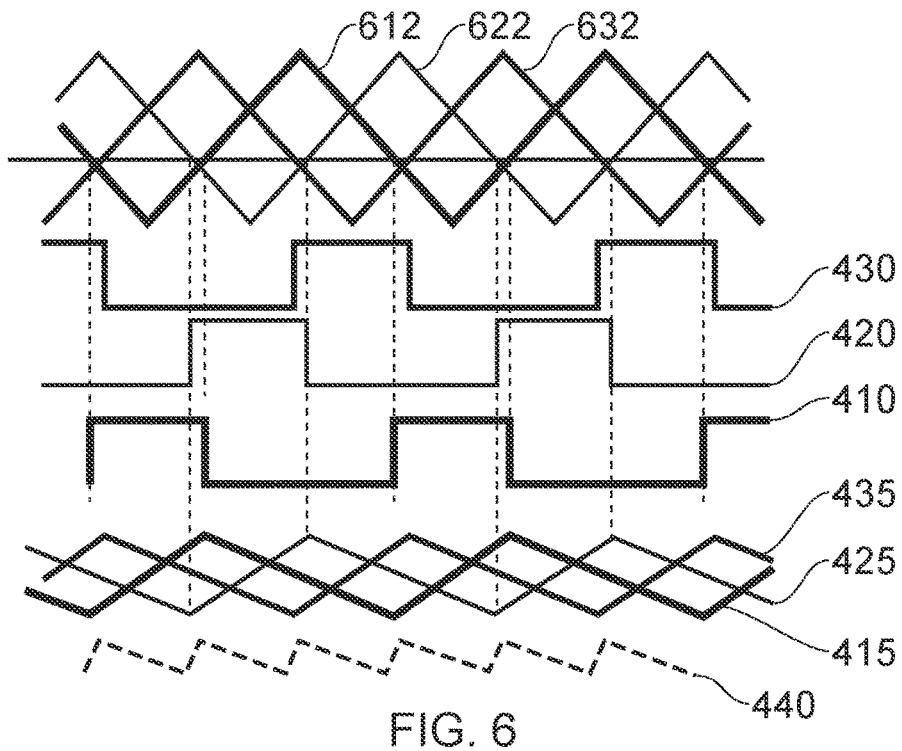
FIG. 6 shows the same intimation as for FIG. 5 for each of the phases of a multiphase DC-DC converter, together with the resulting total output current.

FIG. 6 illustrates distributed control applied to a three-phase DC-DC converter. A symmetrical triangular carrier signal is generated for each phase or converter sub-unit. Once steady state is achieved, the triangular carrier signals have the same profile and shape and the signals are offset in phase relative to each other such that they are equally distributed round 360°; however, during any settling phase, or transients, the spacing and shape of the triangular carrier signals will vary, with either increased or decreased slew-rates as mentioned above. In this particular instance of a three-phase converter, once steady state is achieved as shown, the signals 612, 622, 632, are offset by 120° from each other. The same threshold is applied to each phase, as a result of which the PWM signals for each phase are the same (apart from being offset by 120° from each other), with the same mark-space ratio.

The mismatches, if any, between the output currents from each converter sub-unit using the same level of the threshold to be generated are mainly related to the difference in the resistance paths and the time-switching of the power transistors causing local errors or duty-cycle. Control may then be decentralised by using a feedback mechanism: the difference (if any) between the actual output current from the phase, and the average of that from the two neighbouring phases is used as a control parameter to adjust up or down (550 or 560) the threshold 540—thereby changing the mark-space ratio of the PWM for that phase, and thereby adjusting that phase's output current.

As already mentioned and shown in FIG. 1*a*, the efficiency curve of a multiphase DC-DC converter rolls off at both high current and at low current. Thus, if the total output current of a multiphase DC-DC converter falls below a certain value, the efficiency can be improved by disabling one of the converter sub-units so that a higher current is output by each of the converter sub-units which remains operational. However, such phase-shedding presents a challenge in the case of decentralised control as discussed above.

Figure 7:
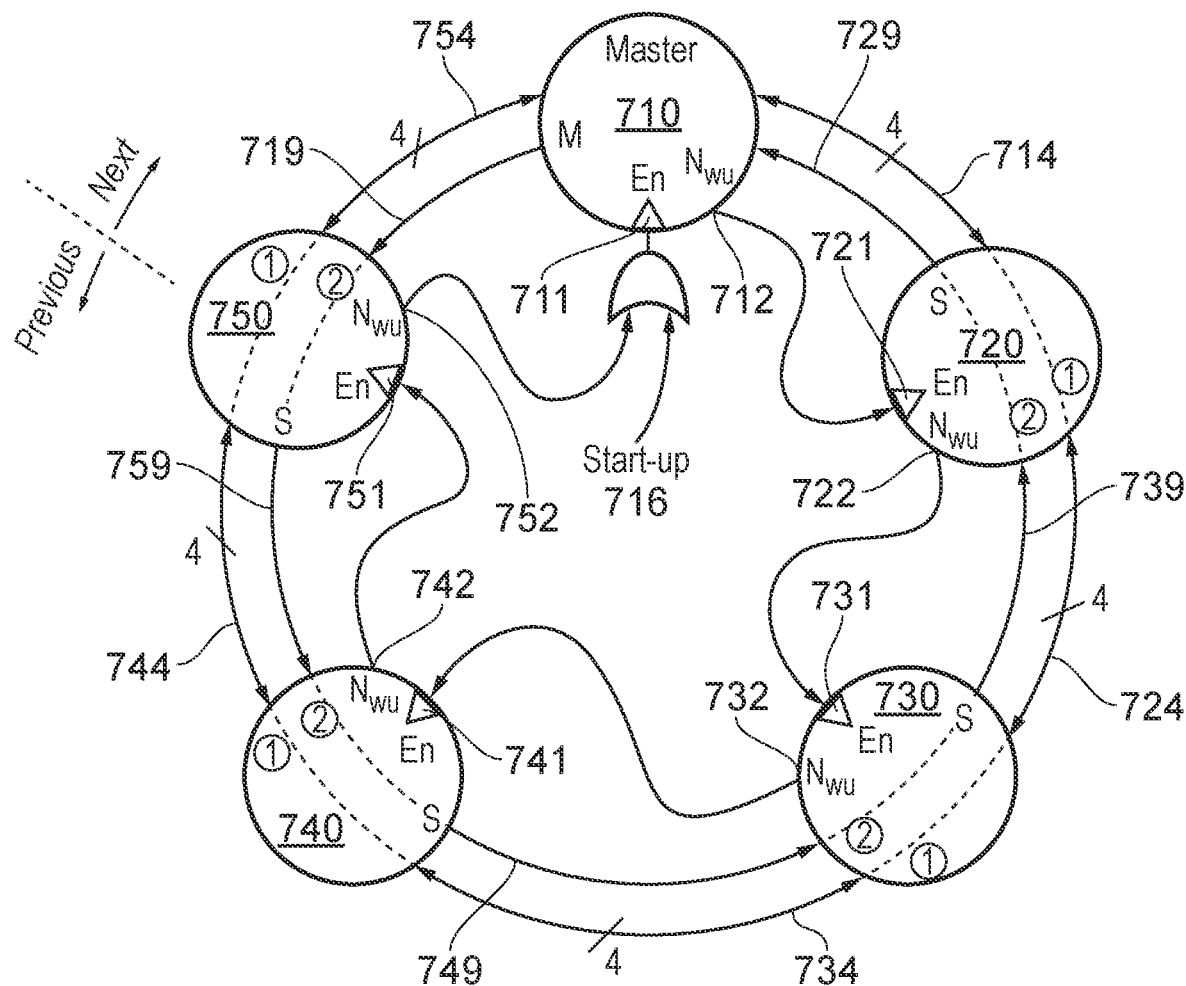
FIG. 7 shows a schematic diagram of the configuration of 5 local control-units, each controlling a separate converter sub-unit of phase, for decentralised phase-shedding method according to one or more embodiments.

FIG. 7 shows a schematic diagram of the configuration of 5 local control-units 710, 720, . . . 750, each controlling a separate converter sub-unit or phase, for implementing a decentralised phase-shedding method according to one or more embodiments. The local control-units are logically arranged in a daisy-chain configuration, such that each local control-unit has a "next" local control-unit and a "previous" local control-unit. For the purposes of illustration only, the daisy-chain is shown in this figure with each local control unit having a "next" local control-unit neighbouring it in a clockwise direction, and a "previous" local control-unit neighbouring it in an anticlockwise direction. The local control-units may in principle be identical: in operation, one local control-unit will be configured to act as a master (M) controller, and the remaining local control-units will be configured to act as slave (S) controllers. Provided that, at the start of operation, the local control-units all know whether they are a slave or the master, the configuration of which local control-unit acts as the master may occur at the start-up of operation, or earlier (e.g. in a set-up or calibration phase, during testing or qualification, or during circuit design).

Each local control-unit has an enable input En 711, 721, . . . 751 configured to receive an enable request, as shown, typically by being sensitive to a rising-edge event or falling-edge event. The enable request comes from the previous local control-unit. It should be remarked that in some circumstances, as will be discussed in more detail below, one or more local control-units may be bypassed such that the enable request comes from or originates from the previous enabled local control-unit.

Each local control-unit has a communication link 719, 729, . . . 759, configured to receive and to send master/slave information. This communication link does not need to be bidirectional. Its purpose is for a local control-unit to send information as to whether it is operating as a master controller or a slave controller to its previous neighbour. Correspondingly, the communication link provides for each local control-unit to receive the corresponding information from its next neighbour. Again, in some circumstances, as will be discussed in more detail below, one or more local control-units may be bypassed such that the master/slave information comes from or originates from the next enabled local control-unit and is sent to the previous enabled local control-unit. Moreover, it should be noted that although the information is described as master/slave information, according to one or more embodiments, a local control-unit does not always send the information which correctly identifies its configuration—in particular, in one or more embodiments there are circumstances under which the master controller may transmit information indicating that it is—or at least that it is masquerading as—a slave, to its previous neighbour.

Each local control-unit has a wake-up output Nwu 712, 722, . . . 752 configured to send a wake-up request to its next neighbour. As will be discussed in more detail below, this output is used in operation to wake up the next local control-unit—that is to say to change that local control-unit from a disabled state to an enabled state. The wake-up output is thus connected to the enable input of the next neighbouring local control-unit.

Each local control-unit has a further communication link 714, 724, . . . 754 configured to facilitate decentralized current balancing and decentralized phase interleaving of the PWM control signals with the other enabled converter sub-units, as discussed above; this communication link is bidirectional, and allows the local control-unit to communicate with its "next" and "previous" local control-unit. The communication link may be a four-wire parallel bus as shown; alternative configurations for the link—such as a serial bus—will be immediately apparent to the skilled person and are within the scope of the present disclosure. In particular, the communication link may be a multi-wire parallel link, or rely on serial communication using fewer wires, or even just one wire.

Each local control-unit has a state indicator (not shown) designated to indicate whether the converter sub-unit is operational as a master (M) sub-unit or a slave (S) sub-unit. The state indicator may be stored in a memory or the information may be otherwise available. For example, the state "Master" or "Slave" of the control-unit may be defined by an input bit state named $M_{aster}$. (0=Slave, 1=Master). This input bit could, for instance, be connected to a microcontroller unit and reconfigurable in case of a failure of the Master, or be tied to an internal OTP (one-time programmable) fuse or non-volatile internal memory, and thus not be reconfigurable.

Each local control-unit also has a memory designated to indicate whether the converter sub-unit is enabled or disabled. Herein "memory" is to be interpreted broadly, and includes for instance, the status of a D-latch device, as will be discussed below with reference to FIG. 9.

Control of a multiphase DC-DC converter, by means of the local control-units 710, 720, . . . 750 each of which can control its own converter sub-unit, and without requiring a central controller, according to embodiments of the present disclosure will now be described.

In summary, each local control-unit can disable itself under certain circumstances, in the event that the local output current flowing through the inductor of its converter sub-unit is lower than a predetermined minimum Imin. Moreover, each local control-unit can attempt to wake up its next neighbour, under certain circumstances in the event that the local output current is higher than a predetermined maximum Imax.

The present inventors have appreciated the "certain circumstances" mentioned above, which are required in order to provide effective control and avoid chaotic or colliding control instructions, as follows.

Figure 1B:
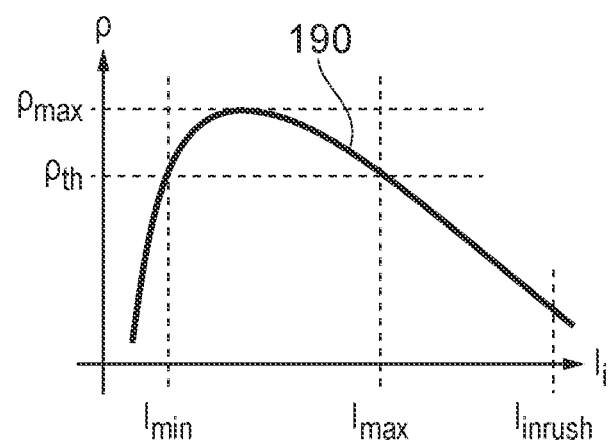

FIG. 1b shows a minimum and maximum current output of local output current Ii 190 for a threshold minimum efficiency for a single phase of a multiphase DC-DC converter. A similar curve applies for each phase. As shown in FIG. 1b, for each phase there is a minimum current Imin below which the efficiency ρ falls below a threshold ρth, and a maximum current Imax above which the efficiency ρ also falls below the threshold ρth.

Firstly, consider the situation where each of the phases are producing output current which is less than Imin. In that case, it is desirable that one of the phases is disabled, such that total output current is provided from one fewer phase so that each operating phase provides a higher output current Ii. However, it is necessary to prevent that all phases disable themselves simultaneously. This is effected, according to embodiments of the present disclosure, by nominating one of the phases as the master (M), and utilising its position in the daisy-chain to ensure an orderly disabling of the phases.

It should be noted that the master is not a central controller, since each phase has its own autonomy. Thus although the master may be determined at the time of manufacture, it is equally possible that it is only determined during a configuration or setup stage, or it may be determined just prior to an operational period of the multiphase converter, provided only that it is possible that one, and only one, of the local control-units is identifiable as the master M, the remaining local control-units being identifiable as slaves S, at the commencement of any operational period. Note also that direct communication between the master and each of the slaves is not required, in order to effect the phase-shedding. Rather, the communication links are daisy-chained as described above. Each and all of the local control units may thus be identical in design, for applications in which the master is determined only after the circuit design.

As already mentioned, in the event that the output current Ii is lower than a predetermined minimum Imin, each local control-unit may disable itself, but only under certain circumstances. In particular, the local control-unit may only disable itself if the "next" local control-unit is the master controller: recall that each local control-unit has a communication link 719, 729, . . . 759, configured to receive master/slave information. In particular, the communication link provides for each local control-unit to receive that information from its next neighbour. Since there is only one master controller, there is only one local control-unit for whom the next neighbour is the master, and thus only one local control-unit may disable itself at any time.

Without an adaptation to this rule, once the local control-unit previous to the master controller—as defined by its position in the daisy-chain—is disabled, then there is no other local control-unit which satisfies the condition that the next neighbour is the master: thus if the current for each operational phase is still below, or subsequently falls below, Imin, no other local control-unit would be able to disable itself. In order to avoid this, the local control-units are arranged to pass through the master/slave information when disabled. That is to say, when disabled, a local control-unit does not communicate whether it (itself) is a master or slave to its previous neighbour: rather, it passes through the information from the next local control-unit as if it were the next local control-unit. Thus, the previous local control-unit receives information from the next enabled local control-unit, "skipping" any disabled local control-unit in between.

In one or more embodiments, there is provided a programmable delay, between the local control-unit disabling itself and allowing the master/slave information to pass through such that its previous neighbour receives the master/slave information from its next neighbour. During that delay period, the disabled local control-unit may continue to transmit its own master/slave status, which the skilled person will realise will be 'slave' information, since only a slave local control-unit may disable itself.

It should be noted that the programmable delay is not implemented for the communication link which transmits information about the local output current of neighbouring converter sub-units, and the signals required to achieve the required interleaving. As soon as a local control-unit becomes disabled, its next neighbour and previous neighbour need to be able to communicate with each other, so for this link the passthrough communication is established immediately.

As already discussed, according to various embodiments of the present disclosure, local control-units may selectively be disabled or enabled in dependence on whether the local output current Ii is greater than a first threshold or less than a second threshold value. The local output current Ii may be measured instantaneously, or may be an average value over a time interval. The time interval may be one or an integral number of conversion cycles, or may be a smaller period. The method by which Ii is determined may be dependent on the current sensing method. The skilled person will be familiar with several alternatives, which will be briefly discussed below with reference to FIG. 9 and current sensor 962. Thus Ii may correspond to an instantaneous value Ii_inst, or an average or integrated value Ii_int.

To take a concrete example, consider FIG. 7. If local control-unit 750 determines that its output current Ii is below the minimum Imin, it will disable itself (since it has received information from the next neighbour that that next neighbour is the master 710. The skilled person will appreciate that this information may be transmitted by any one of several means, including a continuous hi/low on a wire, or a digital signal, continuously or periodically transmitted, etc.). Conversely, if local control-unit 710 determines that its output current Ii is below the minimum Imin, it cannot disable itself, since it has received information from the next neighbour that its next neighbour—720—is a slave. Further, subsequent to local control-unit 750 disabling itself, and after any programmed delay, if local control-unit 740 determines that its output current Ii is below the minimum Imin, it will disable itself: since local control-unit 750 is disabled, it passes through the master/slave information such that local control-unit 740 receives information from the next enabled neighbour that that next neighbour is the master 710.

There is a further adaptation to the rule: the local control-unit which is operating as the master controller is not allowed to disable itself. Without this adaptation, the situation could arise wherein, under a low power requirement, all of the local control-units are sequentially disabled and thus the multiphase converter does not provide any power at all.

According to one or more embodiments of the present disclosure, if the master controller is the only local control-unit which has not been disabled, and the current is still below the threshold current, the master controller may enter a low power mode. Low power modes will be known to those skilled in the art, generally, but not exclusively, hysteretic control will be implemented, and may include pulse skipping modes or pulse frequency modulation (PFM) operation. Alternatively, low-power control can be implementation through linear regulation, such as with a low-drop-out (LDO) circuit.

Turning now to the situation where one or more of the local control-units are disabled, and the current provided by the remaining, enabled, converter sub-units with enabled local control-unit is higher than the predetermined maximum current Imax. As already briefly mentioned, each local control-unit can attempt to wake up its next neighbour, under certain circumstances. The "certain circumstances", which are required in order to provide effective control and avoid chaotic or colliding control instructions will now be described.

In summary, the general rule is that if the current Ii from an enabled phase is higher than the predetermined maximum current Imax, it will ask that the next neighbour phase be enabled, using the wake-up signal Nwu. In general, the average value, Ii_int, of the local output current over one of more conversion cycles will be used, although it is also possible that a shorter sampling period, or an instantaneous value, Ii_inst, of the local current, is used: of course, it may be that that next neighbour local control-unit is already enabled, in which case the wake-up signal will not have any effect. However, in the case that the next neighbour local control-unit is currently disabled, it will become enabled.

The infrastructure described above may, in addition, be used to implement other functions of the multiphase DC-DC converter. Consider first a start-up requirement. Under a start-up situation, it may be preferable that the phase-shedding function described above is not operable: specifically, it may be appropriate for the multiphase DC-DC converter to start-up with most, or in general all of its phases being enabled since the actual current requirement will not generally be known a priori, and so it may be appropriate to cyclically or simultaneously enable every phase, particularly if the duration of the programmable delay between enabling separate phases is significant.

In such embodiments, when the multiphase DC-DC converter is required to start-up—that is to say, when current is first required after a period during which even the master controller is disabled—an activation signal "Start-up" 716 is provided to the enable pin 711 of the master controller. Since the enable pin may also be set by the next wake-up Nwu of the previous local control-unit, this may be implemented by including an OR logic gate as shown at 715.

As mentioned, it may be preferable that all of the converter sub-units start operating at the same time. This may be implemented by broadcasting a global wake-up signal (Gwu) to all of the local control-units operating as slaves.

Figure 8:
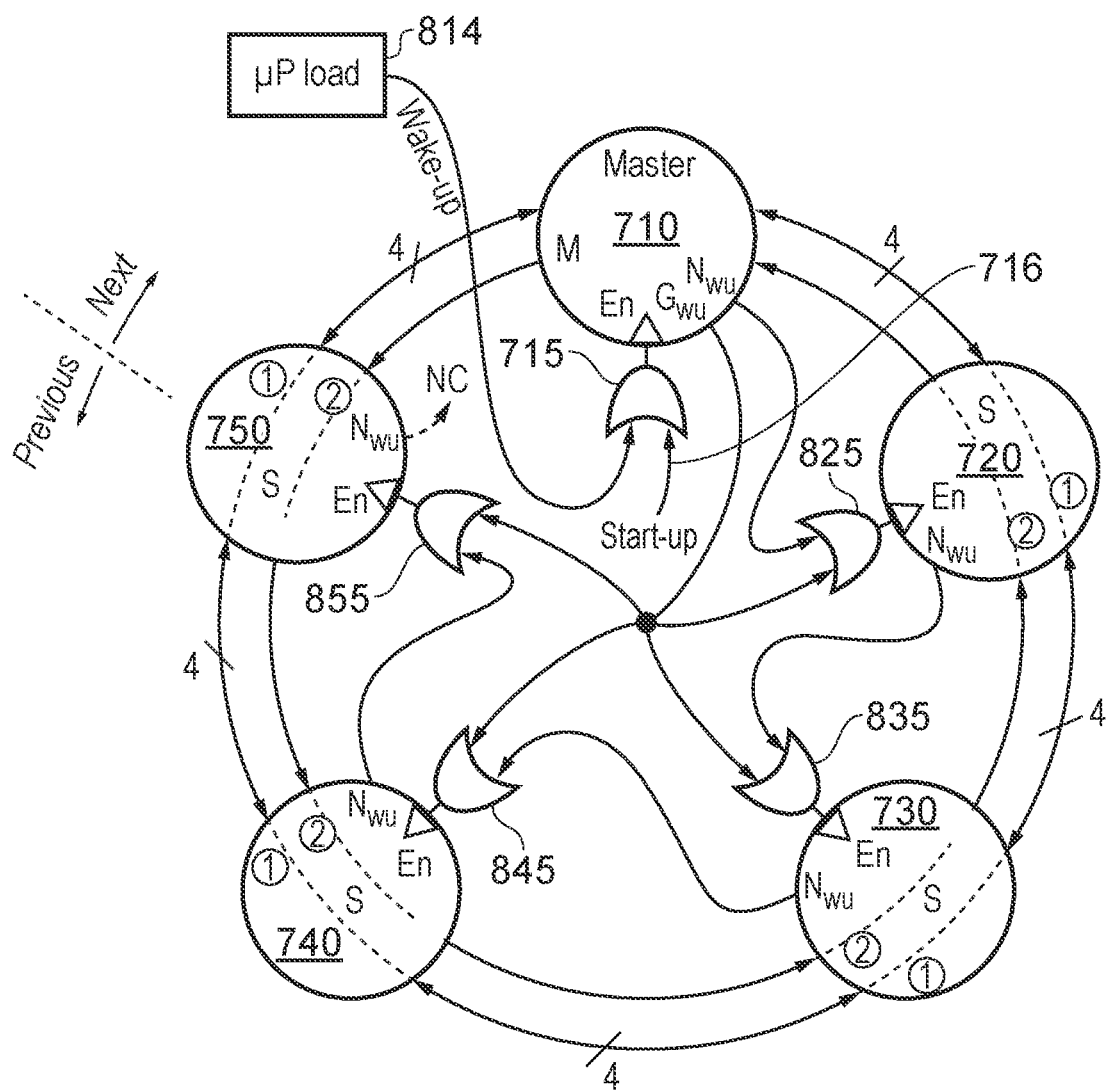
FIG. 8 shows, schematically, a schematic diagram of decentralised phase-shedding method according to other embodiments.

FIG. 8 shows one possible implementation of this. FIG. 8 is similar to FIG. 7 except that the load (in this case a microprocessor) communicates a Wake-up signal 814 to the master controller. The master controller may then broadcast the global wake-up signal to the enable pin of each of the slaves. Again, since the enable pin may receive multiple signals, this may be implemented through OR gates 825, 835, . . . 855 as shown. It will be appreciated that since the master controller already has an OR gate for the enable pin, the result is that all local control-units (whether operable as master or slaves) have the same layout. FIG. 8 also shows an optional start-up input 716, which may be provided to the enable input EN of the local control-unit operable as master controller 710, as discussed with respect to FIG. 7. However in this embodiment, as shown, the next wake-up signal from the logically previous controller subunit 750 is left unconnected, since the master will generally always be operational—apart from before the unit has started up—a "next wake-up signal Nwu" is not required to the master controller 710.

It will be understood that "Start-up" may be a signal provided from an external component (a field programmable gate array, FPGA, of the motherboard for instance) to start the multiphase converter and to power the load, such as a microprocessor, for instance. Conversely, "Wake-up", in such cases, is a signal provided during operation (by the load for instance) to inform the multiphase converter that a strong predictable load current will be required very soon.

It will be appreciated, that alternatively, the wake-up signal may be supplied externally, for instance directly from the load, to all the local control-units simultaneously.

Furthermore, according to embodiments of the present disclosure, phase-shedding can be effectively disabled by adjusting the master/slave information transmitted by the master controller during a global wake-up or start-up period. During this period, the master controller may be configured to transmit information on the communication link that it is—or at least that it is masquerading as—a "slave". As a result, no slave controller will receive information that its next enabled neighbour is the master, in consequence of which no slave controller can elect to disable itself. Of course, once the start-up phase is complete—for instance after a programmable delay, the master may revert to transmitting its correct "master" status, which then facilitates phase-shedding.

Figure 9:
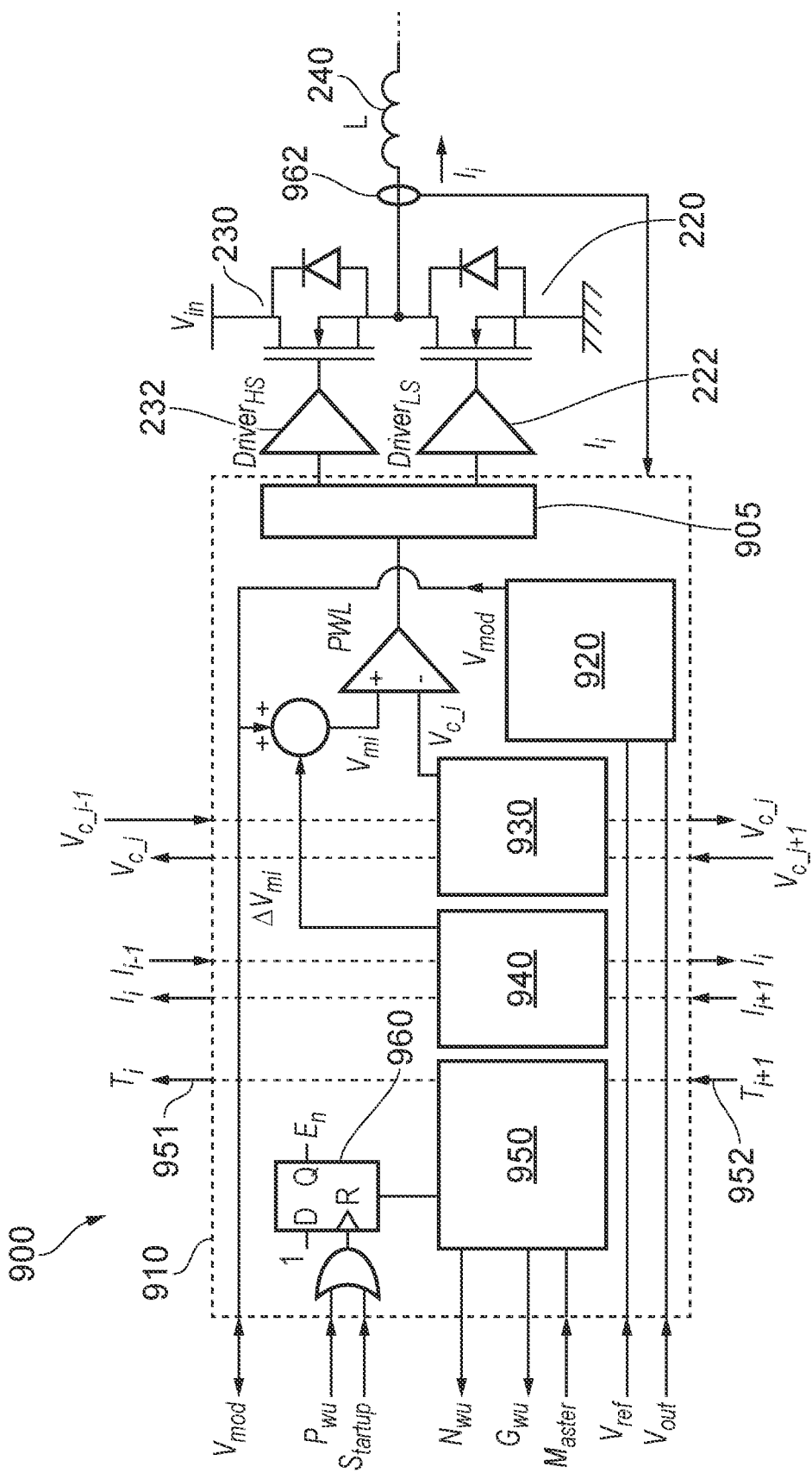
FIG. 9 shows, schematically, a converter sub-unit for use in a multiphase DC-DC converter according to one or more embodiments.

FIG. 9 shows, schematically, a converter sub-unit 900 for use as the i-th sub-unit in a multiphase DC-DC converter, according to one or more embodiments. A switching cell comprising high-side transistor 230 and low-side transistor 220 connect a supply Vin to a ground. The transistors are driven by respective drivers 232 and 222 and arranged to operate in complementarity, by control logic 905 which may be, as shown, comprised in the local control-unit 910. The local output current Ii through the inductor 240 is sensed by means of a current sensor 962. The skilled person will appreciate that several alternative means of current sensing may be used.

The local control-unit also comprises a "carrier generator" 930 and current balancing unit 940, as well as a phase-shedding controller 950. The enable input to phase-shedding controller 950 is provided through a flip-flop 960, in order to remember the state (active or not) of the overall converter sub-unit after transitory wake-up or start-up signals.

Current balancing may be achieved, for instance, as is described in WO2014/005973. Herein, the current balancing unit 940 is connected by the further communication link to the responding current balancing units in the ith+1 and the ith−1 converter sub-unit (that is to say, the next and previous neighbour sub-units), and exchanges current information $I_i$ and $I_{i+1}$ with the ith+1 converter sub-unit and current information $I_{i-1}$ and $I_i$ with the ith−1 converter sub-unit, in order to achieve current balancing.

Similarly, also described in in WO2014/005973, the carrier generation unit 930 is connected by the further communication link to the responding carrier generation units in the ith+1 and the ith−1 converter sub-unit (that is to say, the next and previous neighbour sub-units), and exchanges triangular carrier voltage information $V_{c\_i}$ and $V_{c\_i+1}$ with the ith+1 converter sub-unit and triangular carrier voltage $V_{c\_i-1}$ and $V_{c\_i}$ with the ith−1 converter sub-unit, in order to achieve the interleaving of the PWM control signals, as discussed above with reference to FIG. 6. It should be noted that although these signals in FIG. 9 are shown as analogue signals (with reference, for instance to voltages), in the alternative information may be exchanged digitally Local control-unit 910, includes the following inputs and outputs, which are used in order to implement the embodiments discussed above:
Master: Input pin to define if the circuit is a Master (M) or a Slave (S),
Gwu: Output pin for global wake-up function, only used by the Master,
Nwu: Output pin for next wake-up, used in phase-shedding sequence in case Ii>Imax,
Startup: Input pin for external start up order, only used by the Master,
Wake-up: Input pin for external wake-up order, only used by the Master,
Pwu: Input pin for previous wake-up, only needed by the Slave,
En: Internal signal for the Enable state of the phase.
Ti: Output pin for state of the local phase send to the next phase: M if Master, S if Active Slave, Ti+1 otherwise,
Ti+1: Input pin for the reading of the state of the next phase.

It will be appreciated that, since each local control-unit knows whether it is operational as a master or a slave, the output pin Ti 951 is indicative of the state of an internal memory (which may be implemented as a flag, a bit in a digital word, or otherwise), unless the local control-unit is the master but operating start-up mode and thus transmitting "false" slave information as described above or is disabled in which case the pin Ti provides a copy of the information input pin Ti+1 952 from the next neighbour local control-unit.

Figure 10:
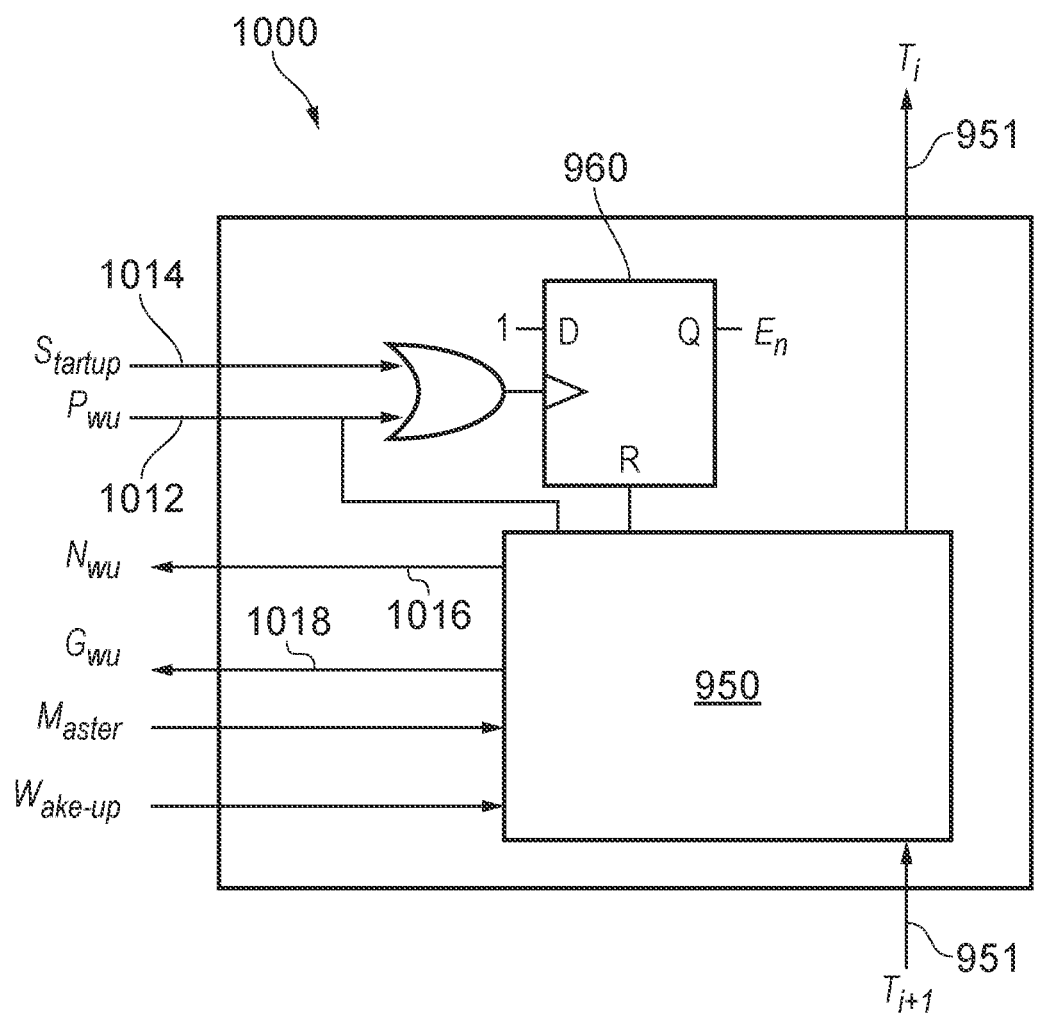
FIG. 10 shows, schematically, a local control-unit according to other embodiments.

FIG. 10 shows, schematically, a local control-unit 1000 according to one or more embodiments. The control unit may have other functions such as the current balancing unit 940 as described above; however, FIG. 10 shows only components and signals may assist in the understanding of the present disclosure. The local control-unit has a phase-shedding controller 950 which is configured to either enable or disable the control logic 905 (not shown in FIG. 10) for either enabling or disabling the PWM control of the local switching cell. When the PWM control is disabled, both transistors are switched off, and the half-bridge node therebetween is in a high impedance state.

As discussed above, the enable input to phase-shedding controller 950 is provided through a flip-flop 960, in order to remember transitory wake-up or start-up signals. The local control-unit 1000 shown has two inputs to the "set" input of the D-type latch, which are combined by an OR gate: one input Pwu 1012 is the previous wake-up input. All local control-units have this input. The other input 1014 may be, as shown, a "Start-up" input—the local control-unit will have this input if it is arranged to be operable as the master controller. Alternatively, it may be a general wake-up input Gwu—the local control-unit will have this input if it is arranged to be operable as a slave controller.

Phase-shedding controller 950 has two outputs Nwu 1016 and Gwu 1018. The next wake-up output Nwu 1016 is connected in the daisy-chain to the previous near neighbour's Pwu input. The general wake-up Gwu output is only connected in the case that the local control-unit is arranged to be the master controller, in which case the output is connected to a bus connecting to all of the slave controllers' respective general wake-up input.

The figure also shows a "Master" input. This is used to externally impose on the multiphase DC-DC converter, which of the local control-units is to act as the master controller. So (in the nonlimiting case of non-inverting logic) it will be high for the master controller and low for all slave controllers. The skilled person will recognise that this may be a transitory signal, or a permanent state. Moreover, the skilled person would also recognise that in one or more embodiments, in particular if the master controller is established during a chip layout or manufacturing stage, this input is not required.

The master slave communication link, and input and output pins Ti 951 and Ti+1 952 have already been described with reference to FIG. 9, and so do not need to be repeated here.

Figure 11:
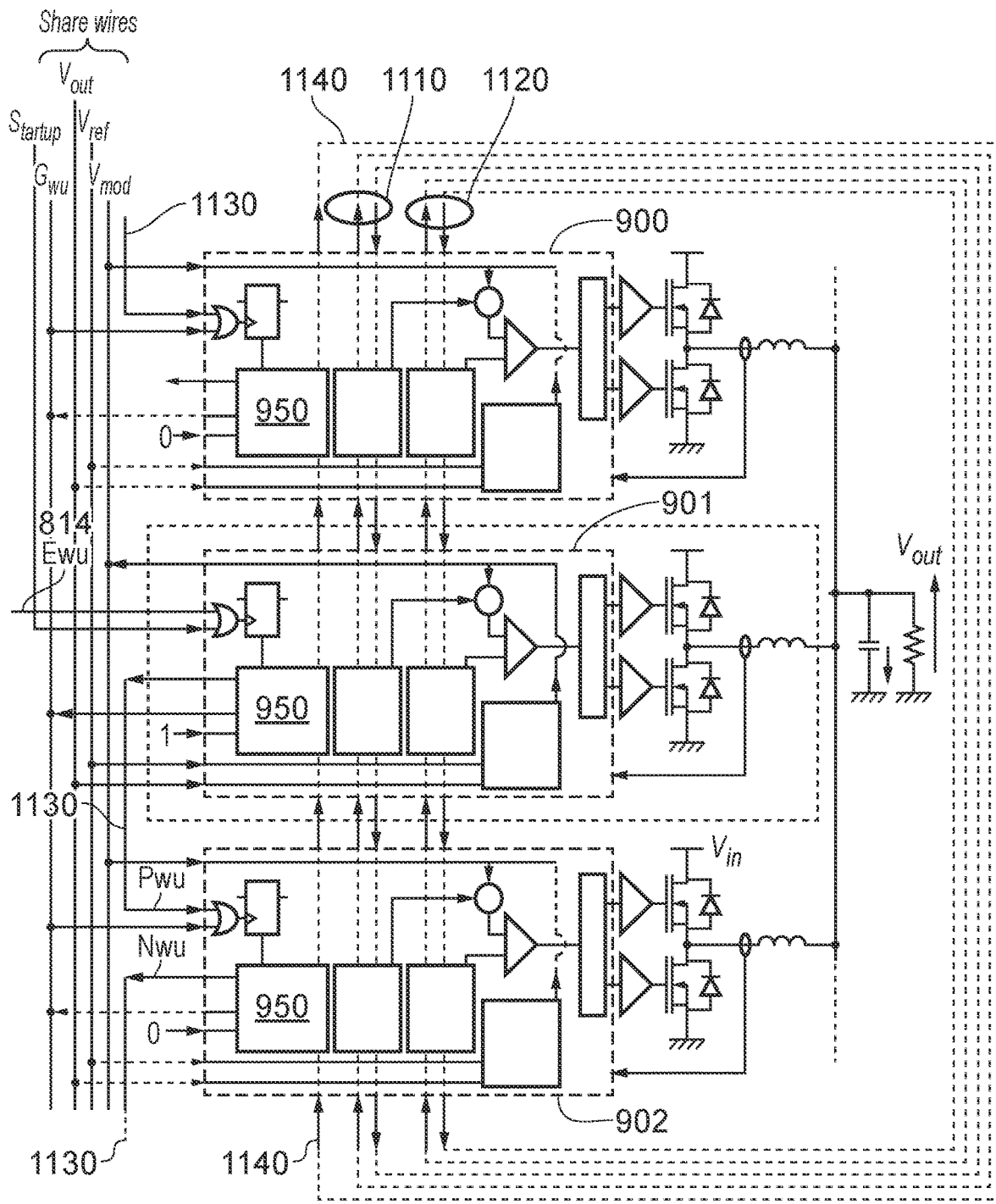
FIG. 11 shows an arrangement of three converter sub-units, arranged according to one or more embodiments.

FIG. 11 shows an arrangement of three converter sub-units, arranged according to one or more embodiments. Each of the converter sub-units has a local control-unit 900, 901 and 902 respectively, including a phase-shedding controller 950, as described above. The converter sub-units are arranged as part of a daisy-chain. As shown, the middle of the three sub-units is arranged as a master controller, whereas the other two sub-units are arranged as slave controllers. The state indicator inputs to the master controller's phase-shedding controller is thus represented by "1" as shown, whereas the state indicator inputs to the other two controllers is, as shown "0".

The figure shows the daisy-chain communication of the carrier generator information (shown at 1120) and that of the current balancing information (shown at 1110). The figure also shows a bus comprising share wires having thereon an output voltage Vout, a reference voltage Vref, and a modulating voltage Vmod. The output voltage and reference voltage are used solely by the master controller; the modulating voltage value is determined by the master controller, and supplied to the bus—it is used by each of the slave controllers.

Figure 12:
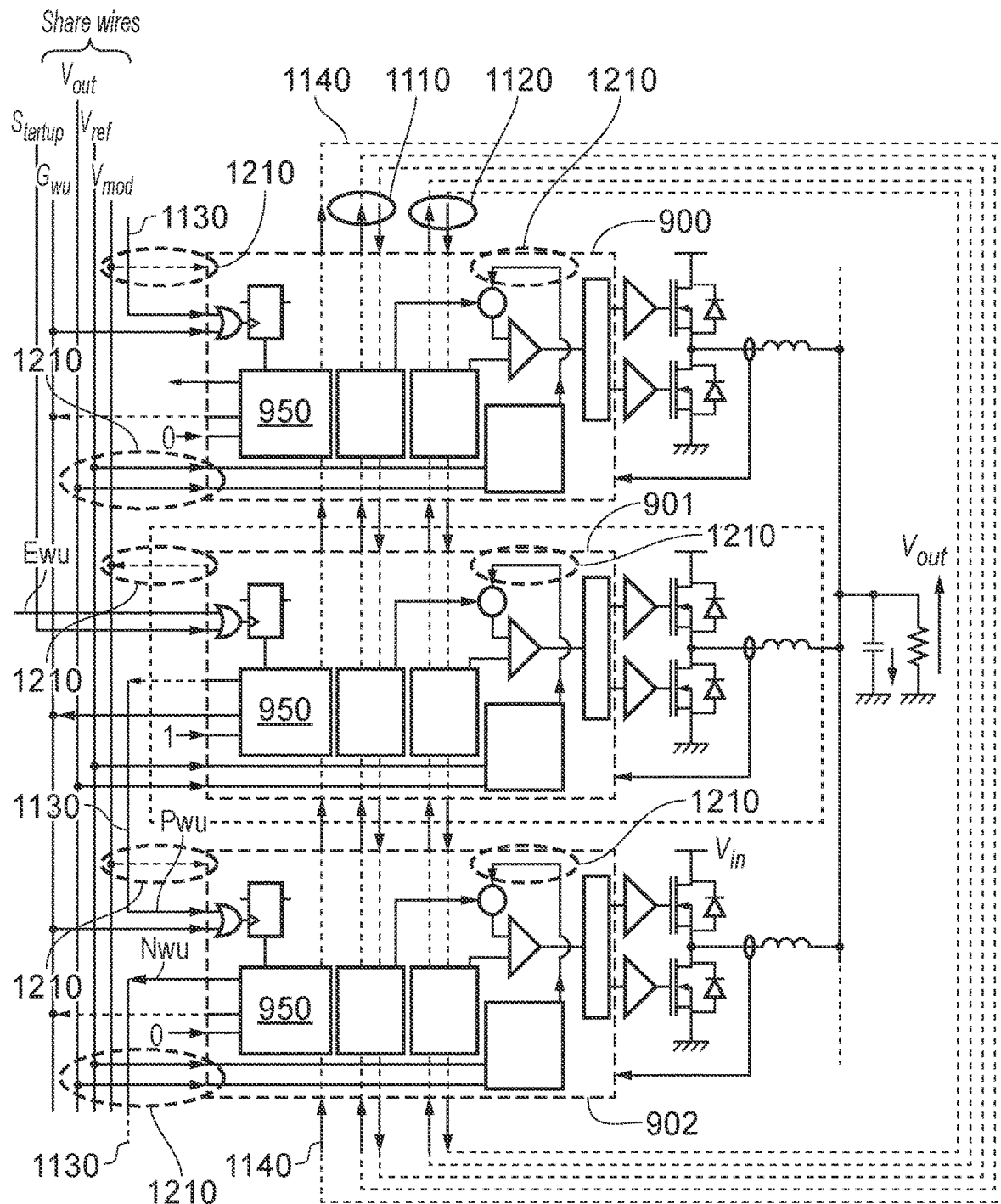
FIG. 12 shows the converter sub-units of FIG. 11, in which the duty-cycle of each phase is computed at a local level.

FIG. 12 shows the converter sub-units of FIG. 11, in which all the phases are identical. The converter sub-units are similar to those in FIG. 11 but the local duty-cycle is computed in each separated sub-module, and the arrangement is also similar, except for the different connections, which are highlighted by ellipses 1210. The common signal Vmod is no longer required.

In addition to these connections, according to one or more embodiments of the present disclosure, an additional share wire in the bus is provided for general wake-up. This signal is provided by the master controller as discussed above for a start-up or general wake-up requirements: it is used as an input for each of the slave controllers. Furthermore, an external wake-up signal connection 814 (Ewu), may be provided just to the master controller as shown.

Furthermore, according to one or more embodiments of the present disclosure, there is as shown the daisy-chained communication links 1130, each link in the daisy-chain sending next wake-up Nwu output from one local control-unit, and previous wake-up Pwu input to the previous local control-unit. Furthermore, according to one or more embodiments there is as shown a further daisy-chained communication link 1140, for transmitting master/slave information.

In one or more other embodiments, a method of locally reacting to inrush current is also provided: referring to FIG. 1*b*, at a value Iinrush of the local current Ii, which is higher than Imax, the local control-unit may be allowed to broadcast the global wake-up signal Gwu. This will then override the sequential re-enablement of phases one-by-one, and immediately enable all the phases of the multiphase DC-DC converter, which is thus able to increase the current output to cope with the inrush demand. Whereas, as already discussed, the local current output (from each converter), may be either an instantaneous current value or an average or integrated value, in general—though not exclusively—an instantaneous value is used for the comparison with the third threshold Iinrush. As will be appreciated, in the case of a high inrush current, it is generally desirable to utilise all of the available local control units and converter subunits.

From reading the present disclosure, other variations and modifications will be apparent to the skilled person. Such variations and modifications may involve equivalent and other features which are already known in the art of multiphase DC-DC converters and which may be used instead of, or in addition to, features already described herein.

Furthermore, although the discussion above has focused on controlling number of active phases depending on the level of the output current, the skilled person will appreciate that the disclosure is not limited to constant-voltage control, and extends to multi-phase DC-DC converters operating with other types of regulation modes.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

It should be noted that as used herein, the terms "next" and "previous", particularly when related to or used in conjunction with the term "neighbour", refer to positions in the daisy-chains of communication links, and not to any temporal or time-based sequencing.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A local control-unit configured for use in a first converter sub-unit of a multiphase DC-DC converter, comprising:
   wherein the first converter sub-unit includes an inductor and a switching cell;
   wherein the multiphase DC-DC converter includes a second converter sub-unit arranged in parallel with the first converter sub-unit;
   wherein the second converter sub-unit includes an inductor, a switching cell, and a local control-unit;
   wherein the local control units in the first and second converter sub-units are arranged in a logical daisy-chain;
   wherein the local control units in the first and second converter sub-units include,
      a state indicator indicative of whether the first and/or second converter sub-unit is operable as a master (M) sub-unit or a slave (S) sub-unit;
      a second indicator indicative of whether the first and/or second converter sub-unit is enabled or disabled;
      an enable input configured to receive an enable request;
      a wake-up output configured to send a wake-up request;
      a communication link input interface and a communication link output interface respectively configured to receive and to send master/slave information; and
      a further communication link input interface and a further communication link output interface, configured to both enable current balancing and phase interleaving between the first and second converter sub-units;
   wherein the local control-unit in the first converter sub-unit is configured to:
      in response to a local output current being higher than a first threshold, send a wake-up request requesting that the second converter sub-unit be enabled; and
      in response to (a) the state indicator being indicative that the local control-unit in the first converter sub-unit is operable as a slave sub-unit; (b) the local output current being lower than a second threshold, and (c) receiving the master/slave information indicative that the second converter sub-unit in the daisy-chain is a master sub-unit, disabling the local control-unit in the first converter sub-unit.

2. A local control-unit as claimed in claim 1, further configured
   to connect the communication link input interface communication link output interface at an end of a programmable delay after the local control-unit in the first converter sub-unit was disabled, to pass through the master/slave information.

3. The local control-unit of claim 2:
   wherein the local control-unit is configured to:
      in response to (a) the state indicator being indicative that the local control-unit in the first converter sub-unit is operable as a master sub-unit; (b) the local output current being lower than the second threshold, and (c) receiving the master/slave information indicative that the second converter sub-unit in the daisy-chain is the master sub-unit, entering a low power control mode; and
      in response to (a) the state indicator being indicative that the local control-unit in the first converter sub-unit is operable as the master sub-unit, (b) the local output current being higher than the first threshold, and (d) the local control-unit in the first converter sub-unit being in the low power control mode, entering a normal control mode.

4. The local control-unit as claimed in claim 3, further configured
to connect the communication link input interface communication link output interface at the end of a programmable delay after the local control-unit in the first converter sub-unit was disabled, to pass through master/slave information.

5. The local control-unit as claimed in claim 4
wherein the low power control mode comprises a one of:
a hysteretic control mode including Pulse-Frequency Modulation (PFM) and Auto Pulse Skipping (APS) and
a linear regulation mode including Low Droop Out (LDO).

6. The local control-unit as claimed in claim 1, further comprising a global wake-up output configured to transmit a global enable request to all other converter sub-units in the DC-DC converter, and a start-up input configured to receive a global enable request.

7. The local control-unit as claimed in claim 1,
wherein the communication link interface and the further communication link interface are arranged as interfaces to either a common parallel bus or to separate parallel buses.

8. The local control-unit as claimed in claim 1,
wherein the communication link interface and the further communication link interface are arranged as interfaces to a common serial bus.

9. The local control-unit as claimed in claim 1, further comprising
an input from a comparator configured to determine whether the local output current is greater than a third predetermined threshold, and configured to broadcast a general wake-up signal, in response to a signal indicative that the output current is higher than the third predetermined threshold.

10. A controller for a multiphase DC-DC converter, comprising:
wherein the multiphase DC-DC converter includes a first converter sub-unit arranged in parallel with a second converter sub-unit;
wherein the first converter sub-units each include an inductor and a switching cell and a local control unit;
wherein the local control units in the first and second converter sub-units are arranged in a logical daisy-chain;
wherein the local control units in the first and second converter sub-units include:
a state indicator indicative of whether the first and/or second converter sub-unit is operable as a master (M) sub-unit or a slave (S) sub-unit;
a second indicator indicative of whether the converter sub-unit is enabled or disabled;
an enable input configured to receive an enable request;
a wake-up output configured to send a wake-up request;
a communication link input interface and a communication link output interface respectively configured to receive and to send master/slave information; and
a further communication link input interface and a further communication link output interface, configured to both enable current balancing and phase interleaving between the first and second converter sub-units;
wherein the local control-unit in the first converter sub-unit is configured to:
in response to a local output current being higher than a first threshold, send a wake-up request requesting that the second converter sub-unit be enabled; and
in response to (a) the state indicator being indicative that the local control-unit in the first converter sub-unit is operable as a slave sub-unit; (b) the local output current being lower than a second threshold, and (c) receiving the master/slave information indicative that the second converter sub-unit in the daisy-chain is a master sub-unit, disabling the local control-unit in the first converter sub-unit.

11. The controller as claimed in claim 10 wherein the local control units in the first and second converter sub-units are identical.

12. The controller as claimed in claim 10, wherein the local control-unit in the first converter sub-unit is configured to:
in response to (a) the state indicator being indicative that the local control-unit in the first converter sub-unit is operable as a master sub-unit; (b) the local output current being lower than the second threshold, and (c) receiving the master/slave information indicative that the second converter sub-unit in the daisy-chain is the master sub-unit, entering a low power control mode; and
in response to (a) the state indicator being indicative that the local control-unit in the first converter sub-unit is operable as the master sub-unit, (b) the local output current being higher than the first threshold, and (d) the local control-unit in the first converter sub-unit being in the low power control mode, entering a normal control mode.

13. The controller as claimed in claim 10,
wherein each low power control mode comprises a one of:
a hysteretic control mode including Pulse-Frequency Modulation (PFM) and Auto Pulse Skipping (APS) and
a linear regulation mode including Low Droop Out (LDO).

14. The DC-DC converter comprising a controller as claimed in claim 10, further comprising,
associated with each local control-unit, a respective inductor and a respective switching cell, which together with the local control-unit form the respective converter sub-unit.

15. A method of controlling a multiphase DC-DC converter, the multiphase DC-DC converter comprising a plurality of converter sub-units in parallel, each converter sub-unit having a respective inductor, a respective switching cell, and a respective local control-unit, the respective local control-units being logically arranged in a daisy-chain, each converter sub-unit being configured to provide a respective local output current when enabled and no output current when disabled, and being configured to, when disabled, pass master/slave information from a next local control-unit in the daisy-chain to a previous local control-unit, the method comprising, in an operational mode:
designating a one local control-unit as a master sub-unit, and the other local control-units as slave sub-units;
each of the local control-units receiving master/slave information indicative of whether a next enabled local control-unit in the daisy-chain is a master sub-unit or a slave sub-unit;
the one of the local control-units, in response to the respective local output current being higher than a first threshold, sending a wake-up request requesting that the next local control-unit be enabled; and
the one of the local control-units, in response to (a) the one of the local control-units being a slave sub-unit, (b) the respective local output current being lower than a second threshold and (c) the next enabled local control-unit in the daisy-chain being a master sub-unit, disabling itself the one of the local control-units.

16. The method as claimed in claim 12, further comprising
the one of the local control-units, in response to (a) the one of the local control-units being the master sub-unit, (b) the respective local output current being lower than the second threshold and (c) the next enabled local control-unit in the daisy-chain being the master sub-unit, entering a low power control mode; and
the one of the local control-units, in response to (a) the one of the local control-units being the master sub-unit, (b) the respective local output current being higher than the first threshold, and (d) the one of the local control-units being in the low power control mode, entering a normal control mode.

17. The method as claimed in claim 16, wherein the low power control mode is a one of Pulse-Frequency Modulation (PFM) and Auto Pulse Skipping (APS).

18. The method as claimed in claim 12, further comprising operating in wake-up mode during a start-up period, by:
the master sub-unit, at the start of the start-up period, transmitting an enable request to all the slave sub-units; and
the master sub-unit transmitting a signal indicative of acting as a slave sub-unit for the duration of the start-up period.

* * * * *